United States Patent [19]
Gifford et al.

[11] Patent Number: 5,614,927
[45] Date of Patent: Mar. 25, 1997

[54] PROTECTING CONFIDENTIAL INFORMATION IN A DATABASE FOR ENABLING TARGETED ADVERTISING IN A COMMUNICATIONS NETWORK

[75] Inventors: Warren S. Gifford, Holmdel; Nancy D. Griffeth, Westfield; James E. Katz, Morristown, all of N.J.

[73] Assignee: Bell Communications Research, Inc., Morristown, N.J.

[21] Appl. No.: 490,001

[22] Filed: Jun. 12, 1995

Related U.S. Application Data

[63] Continuation-in-part of Ser. No. 372,759, Jan. 13, 1995, abandoned.

[51] Int. Cl.[6] ............................................... G06F 17/30
[52] U.S. Cl. ........................ 395/612; 380/25; 395/793
[58] Field of Search ....................... 395/600, 51; 380/25; 364/419.13

[56] References Cited

U.S. PATENT DOCUMENTS

| 4,962,533 | 10/1990 | Krueger et al. | 380/25 |
| 5,191,638 | 3/1993 | Wakami et al. | 395/51 |
| 5,355,474 | 10/1994 | Thuraisingham | 395/600 |
| 5,481,700 | 1/1996 | Thuraisingham | 395/600 |

OTHER PUBLICATIONS

S. Loeb & Y. Yacobi, *Private Information Filters in a Public Network*, – Proc. of the Con. on High Perf. Info Filtering, pp. 1–3, 1991.
Dobkin, Jones & Lipton, *Secure Databases: Protection Against User Influence*, ACM Trans. on Database Sys., vol. 4, No. 1, pp. 97–106, Mar., 1979.
Warner, *Randomized Response: A Survey Technique for Eliminating Evasive Answer Bias*, 60 J. of the Am. Stat. Assoc. pp. 63–69, 1965.
Denning, *Secure Statistical Databases With Random Sample Queries*, ACM Trans. on Database Sys., vol. 5, No. 3, pp. 291–315, Sep., 1980.
Yu & Chin, *A Study on the Protection of Statistical Databases*, Proc. ACM–SIGMOD Int'l Conf. on the Mgmt. of Data, pp. 169–181, 1977.
Chin & Ozsoyoglu, *Security in Partitioned Dynamic Statistical Databases*, Proc. IEEE COMPSAC Conf., pp. 594–601, 1979.
Pernul et al., "A Multilevel Secure Relational Data Model Based on Views", Proceedings. Seventh Annual Computer Security Applications Conference, San Antonio, Texas, 2–6 Dec. 1991, pp. 166–177 Dec. 1991.

Primary Examiner—Thomas G. Black
Assistant Examiner—Paul R. Lintz
Attorney, Agent, or Firm—Loria B. Yeadon

[57] ABSTRACT

A system and method are disclosed for protecting a database against deduction of confidential attribute values therein. A memory 160 is provided for storing the database and a processor 155 is provided for processing the database. Using the processor, the database is electronically partitioning into public attributes, containing nonconfidential attribute values, and private attributes, containing private attribute values. The processor is then used to electronically process the private attribute values to reduce any high correlation between public attribute values and private attribute values. Specifically, the processor can partition the database into safe tuples and unsafe tuples, which unsafe tuples have highly correlative public attribute values. The processor can then selectively combine the public attribute values of the tuples to camouflage such tuples from deduction of their private attribute values beyond a threshold level of uncertainty or remove such tuples from the database.

47 Claims, 4 Drawing Sheets

|  | 2-1 | 2-2 | 2-3 | 2-4 | 2-5 | 2-6 |
|---|---|---|---|---|---|---|
|  | NAME | AGE | WEIGHT | HEIGHT | SOC-SEC | TEL. |
| 3-1 | SMITH | 21 | 150 | 170 | 999-12-3406 | 1234 |
| 3-2 | JONES | 5 | 70 | 107 | 999-12-3456 | 2345 |
| 3-3 | JOHNSON | 26 | 175 | 172 | 999-34-5678 | 3456 |
| 3-4 | KRANE | 35 | 160 | 165 | 999-45-6789 | 4567 |
| 3-5 | CARTWRIGHT | 71 | 145 | 167 | 999-56-7891 | 5678 |
| 3-6 | KOOP | 65 | 160 | 175 | 999-67-8912 | 6789 |
| 3-7 | AMES | 58 | 172 | 183 | 999-78-9123 | 7890 |
| 3-8 | BROWN | 32 | 189 | 178 | 999-89-1234 | 8901 |
| 3-9 | SEBASTIAN | 31 | 206 | 185 | 999-91-2345 | 9012 |
| 3-10 | LEE | 40 | 171 | 180 | 999-98-7654 | 0123 |
| 3-11 | MOORE | 46 | 121 | 165 | 999-97-6543 | 0987 |
| 3-12 | PERSOD | 15 | 158 | 167 | 999-76-5432 | 1098 |

PROTECTING CONFIDENTIAL INFORMATION IN A DATABASE FOR ENABLING TARGETED ADVERTISING IN A COMMUNICATIONS NETWORK

RELATED APPLICATION

This application is a continuation in part of application Ser. No. 08/372,759, filed Jan. 13, 1995 now abandoned.

FIELD OF THE INVENTION

The present invention is related to a system and method for maintaining the confidentiality of certain information in a database. According to an illustrative embodiment, the database illustratively contains demographic information regarding customers of a communication network. The system and method can enable advertisers to target specific ones of the customers, whose demographics meet an advertizer specified profile, for advertising via the communications network. In particular, the method and system relate to processing the demographics database to ensure that private information of the customers cannot be deduced by the advertisers beyond a controllable level of uncertainty, so that an advertiser cannot deduce the specific confidential information belonging to a specific customer.

BACKGROUND OF THE INVENTION

The present invention is relevant to delivery of information in any kind of information infrastructure. The invention is illustrated herein using a communications network type of information infrastructure which can deliver video programming.

In a typical network in which advertisements or other video programming are delivered, such as a conventional cable television network, the advertisements are delivered to many customers indiscriminately. This is disadvantageous for the customers because some customers are subjected to advertisements in which they have no interest. It is also disadvantageous to the advertisers because the advertisers must pay to deliver the advertisement to a large audience of customers including, the customers they desire to reach and the customers who have no interest in the advertisement.

In a preferred advertisement strategy, the advertisers target a selected group of the customers who are more likely to be interested in the advertisements and deliver the advertisements to only the selected group of customers. Until recently, such targeted advertisement was not possible in broadcast communications because the communications network in which the advertisements were delivered did not permit delivery of advertisements to only specified customers. However, recent advances in communications networks have made such selective delivery of broadcasted advertisements possible. FIG. 1 depicts one such illustrative improved prior art communications network 10. Illustratively, the communications network 10 may be any kind of network such as a telephone network, a computer network, a local area network (LAN), a wide area network (WAN), a cable television network, etc. As shown, the network 10 interconnects sources 21 and 22, such as advertisers, to destinations 31, 32, 33 and 34, such as customers. The communications network 10 can transport video, audio and other data from a source, e.g., the source 21, to only specific ones of the destinations 31–34, e.g., the destinations 31 and 33. For example, the video, audio and data may be transmitted as a bitstream which is organized into packets. Each packet contains a header portion which includes at least one identifier, for a destination 31, 32, 33 and/or 34, that is unique over the network 10 (e.g., the identifiers for the destinations 31 and 33). These identifiers are referred to as network addresses. The packet is routed by the communications network 10 only to those destinations 31 and 33 as specified by the network addresses contained in the header of the packet.

In order to implement the targeted advertising strategy, the advertisers must be able to determine the customers to which the advertisements are targeted. Advantageously, demographic data regarding the customers is compiled into a database. A database is defined as a collection of data items, organized according to a data model, and accessed via queries. The invention herein is illustrated using a relational database model. A relational database or relation may be organized into a two dimensional table containing rows and columns of information. Each column of the relation corresponds to a particular attribute and has a domain which comprises the data values of that attribute. Each row of a relation, which includes one value from each attribute, is known as a record or tuple.

FIG. 2 shows an exemplary relational database (prior art) Y. The relation Y of FIG. 2 contains data pertaining to a population group. The relation Y has six attributes or columns 2-1, 2-2, 2-3, 2-4, 2-5 and 2-6, for storing, respectively, name, age, weight, height, social security number and telephone extension data values of the population. The database also has twelve records or tuples 3-1, 3-2, 3-3, . . . , 3-12. Each tuple 3-1, 3-2, 3-3, . . . , 3-12 has one data value from each attribute. For instance, the tuple 3-10 has the name attribute value "lee", the age attribute value 40, the weight attribute value 171, the height attribute value 180, the social security number attribute value 999-98-7654 and the telephone extension attribute value 0123.

To identify the targeted customers for an advertisement, a profile containing queries is executed against the database. A query is used to identify tuples which meet criteria of interest from the database. A query usually includes a predicate which specifies the criteria of interest. For instance, the following query executed against the relation Y:

Select from A where Y.Age<15 OR Y.Age>50 includes the predicate "where Y.Age<15 OR Y.Age>50" which specifies that only those tuples having an Age attribute value less than 15 or greater than 50 are to be identified. The advertiser can thus construct a profile for execution against the relational database to identify the targeted audience of customers.

The problem with implementing such a targeted advertising scheme is that customers may be reluctant to wholesale disclose the necessary demographic data for constructing the relational database. In particular, customers may be concerned about:

(1) direct release of raw information about an individual customer, (2) deduction of non-released information of an individual customer from information regarding the identity of the customers who match a given profile, and (3) deduction of non-released information of a specific individual customer from knowledge of a series of profiles, together with the number of individual customers that received or would receive the advertisements corresponding to those profiles.

The first two threats to privacy can be overcome by modifying the communications network in a fashion similar as has been done for protecting anonymity of customers who retrieve video in Hardt-Kornacki & Yacobi, *Securing End-User Privacy During information Filtering*, PROC. OF THE CONF. ON HIGH PERF. INFO. FILTERING, 1991. Such a modified network is shown in FIG. 3. As shown, the communications network 50 interconnects sources (advertisers) 61, 62 and destinations (customers) 71, 72, 73 and 74 similar to the network 10 of FIG. 1. However, a filter station 80 and name translator station 90 are also provided which are connected to the communications network 50. Illustratively, the filter station 80 has a memory 82 for maintaining the database of customer demographic data. Furthermore, the filter station 80 has a processor 84 which can execute queries against the demographics database stored in the memory 82. Each source, such as the source 62, has a server 64 and a memory 66. The server 64 of the source 62 transmits one or more profiles (containing queries for identifying particular target audiences) to the processor 84 of the filter station 80. The processor 84 executes each profile query against the relational database stored in the memory 82 to retrieve the aliases assigned to each customer identified by each query. The processor 84 then transmits the corresponding aliases for each profile back to the server 64 of the source 62 which may be stored in the memory 66 for later use.

When the advertiser-source 62 desires to transmit the advertisement to the targeted customer destinations, e.g., the destinations 72 and 74, the server 64 transmits the advertisement and the aliases into the network 50. The network 50 delivers the advertisement and aliases to the processor 92 of the name translator station 90. The processor 92 then translates the aliases to their corresponding network addresses, for example, using information stored in a memory 94. The processor 92 of the name translator station 90 then transmits the advertisement to the customer destinations 72, 74 using the network addresses.

In the modified communications system, the customer-destination, e.g., the destination 72, knows its own demographic information. The advertiser-source, e.g., the source 62, knows its advertisement, its profiles and how many customers will receive the advertisement. The advertiser only receives aliases for the individual customers 71–74. Thus, the advertiser does not posses the raw demographic information and is not given information for identifying the customers 71–74 (such as the network addresses). The filter station 80 contains information regarding the entire demographics database and receives the profiles submitted by the advertisers. The name translator station 90 contains only the translations of aliases to network addresses and receives the aliases and advertisements. The network 50 only receives the advertisement and network addresses of the destinations.

Despite such protections, the advertiser still obtains some results of the execution of the queries of the profiles against the demographics database, such as the number of customers which match each profile. This may be sufficient information to deduce personal information of the customer. For example, suppose the advertiser knows the identities of 100 customers in the zip code 07090 who collect stamps. Furthermore, suppose the advertiser submits a profile for targeting all customers in zip code 07090 who collect stamps and who have an annual income of $50,000–$100,000. If 100 aliases are returned to the advertiser, then the advertiser successfully deduces the salary range of all 100 stamp collectors.

The above threat, wherein query results can lead to deducing private information, is referred to as a "tracker attack." Stated more generally, a "tracker" is a special case of a linear system which involves solving the equation:

$$HX = Q \qquad (1)$$

where: H is a matrix which represents tuples that satisfy corresponding queries, where each column j represents a different tuple, each row i represents a different query and where each matrix element $h_{ij}=1$ if the $j^{th}$ tuple satisfies the predicate $C_i$ of the $i^{th}$ query and 0 otherwise, C is a vector representing the predicates used in each $i^{th}$ query, X is a vector representing the (unknown) tuples which satisfy the predicates C (to be solved by equation (1)), and Q is a vector of counts or other results returned by each $i^{th}$ query containing elements $q_i$ where each $q_i$ is the sum (or other result returned from the $i^{th}$ query) over an attribute of the tuples retrieved by the $i^{th}$ query.

The prior art has proposed some solutions for protecting statistical relational databases from tracker attacks. Dobkin, Jones & Lipton, *Secure Databases: Protection Against User inference*, ACM TRANS. ON DATABASE SYS., vol. 4, no. 1, March, 1979, p.97–106 proposes to restrict query set overlap, i.e., to prevent submission of multiple similar query sets, to prevent this kind of attack. However, such a control is difficult to implement because a history of all previously submitted query sets must be maintained and compared against the most recent submitted query. A "cell-suppression" technique has also been proposed wherein statistics, or other query execution results, that may reveal sensitive information are never released. However, cell-suppression techniques are best used for queries which produce two and three dimensional tables but not for arbitrary queries which are of concern in implementing targeted advertising.

Random noise techniques have been proposed wherein a random number is subtracted from the results returned by a query. This solution is not satisfactory for implementing targeted advertising because the result presented to the advertiser would then be inherently inaccurate. In an alternative scheme proposed in Warner, *Randomized Response: A Survey Technique for Eliminating Evasive Answer Bias*, 60 J. OF THE AM. STAT. ASSOC. p.63–69 (1965), individuals may enter erroneous values into the relational database a certain percentage of the time. The problem with this strategy is that the advertisers would then target advertisements to the wrong audience a certain percentage of the time. Denning, *Secure Statistical Databases Under Random Sample Queries*, ACM TRANS. ON DATABASE SYS., vol. 5, no. 3, September, 1980, p.291–315 discloses a noise technique wherein the queries are applied to only random subsets of the tuples rather than all of the tuples in the relational database. In addition to the specific disadvantages mentioned above, one or more of the above-described noise addition techniques may be subverted by a variety of noise removal methods.

Yu & Chin, *A Study on the Protection of Statistical Databases*, PROC. ACM SIGMOD INT'L CONF. ON THE MGMT. OF DATA, p.169–181 (1977) and Chin & Ozsoyoglu, *Security in Partitioned Dynamic Statistical Databases*, PROC. IEEE COMPSAC CONF., p. 594–601 (1979) disclose methods for partitioning the relational database into disjoint partitions.

All of the above methods were developed primarily for statistical databases and do not have properties which enable the implementation of targeted advertising. In particular, the above methods do not provide precise identification of tuples which satisfy queries or do not provide an accurate count (or other returned query result) of such retrieved tuples. However, both of these properties are important in targeted advertising. First, it is important to accurately target all customers whose demographic data matches a submitted profile. Second, it is vital to obtain an accurate count of the identified customers for purposes of billing the advertiser and for purposes of deciding whether or not the profile identified a desirable number of customers for receiving the advertisement.

It is therefore an object of the present invention to overcome the disadvantages of the prior art. It is another object of the present invention to provide a targeted advertising method which preserves the privacy of confidential information of the customer. In particular, it is an object of the present invention to reduce the advertisers' ability to deduce confidential information about the customers from the results of one or more profile queries executed against a demographics relational database.

SUMMARY OF THE INVENTION

These and other objects are achieved according to the present invention. According to one embodiment, the present invention can maintain the confidentiality of information in database for use in a communications system environment. As in the prior art communications system, this embodiment provides a communications network which interconnects an advertiser, customers, a filter station and a name translator station. Illustratively, the filter station maintains a demographics database of information regarding the customers. However, the invention can work with databases storing any kind of information and can work for both relational and non-relational databases. In order to obtain a target audience for an advertisement, the advertiser can submit one or more profiles containing queries to the filter station. The filter station executes the profile queries against the demographics database in order to identify tuples corresponding to customers who match the profile of the targeted audience. To preserve the anonymity of the customers, the filter station transmits aliases, instead of identifying information, for the customers identified by the profile to the advertiser. When the advertiser desires to deliver an advertisement to the target audience of customers, the advertiser transmits the advertisement and the aliases via the communications network to the name translator station. The name translator station then translates the received aliases to the network addresses of the customers using its translation table and then transmits the advertisement to the customers via the communications network.

Like the conventional communications network, the communications network according to an embodiment of the present invention restricts the access of the advertisers to the demographics relational database and discloses aliases to the advertisers in lieu of the actual network addresses of the customers. This prevents:

(1) disclosure of the raw information in the database to the advertiser, and (2) deduction of confidential information from the identity of customers. However, unlike the conventional communications system, the present invention also provides for reducing the advertiser's ability to deduce confidential information from the results returned by the filter station in response to the profile queries submitted by the advertiser. That is, the present invention protects against tracker attacks and other kinds of confidentiality breeches, wherein the advertiser attempts to deduce confidential information about the customers in the database from, for example, the mere number of aliases returned in response to a profile query.

To achieve this protection in the present invention, the attributes are divided into two classes, namely, public attributes, for which no confidentiality protection is provided, and private attributes, for which confidentiality protection is provided. In order to prevent an advertiser from deducing private attribute values, the database is thereafter processed to reduce any high correlation between public attribute values and private attribute values. A vector of one or more particular public attribute values is said to have a high correlation with a private attribute value, if:

(1) the vector of particular public attribute values identifies a group of tuples of the database which have public attribute values that match the vector of public attribute values, and (2) the level of uncertainty regarding the values of the private attribute of the identified group is less than a predetermined threshold.

Stated another way, a specific vector of public attribute values of tuples may correspond to a small number of private attribute values thus reducing the uncertainty about the private attribute values when the public attribute values are known. In the worst case, the vector of public attribute values would correspond to only a single private attribute value. Thus, there might be a high level of certainty in determining the actual private attribute values of the group of tuples identified by a given vector of public attributes. Illustratively, if the number of distinctly different private attribute values for the group identified by such a vector is less than a predetermined threshold number of values, then the correlation of the public attributes is unacceptably high. Herein, a public attribute value with an unacceptably high correlation with one or more private attribute values is referred to as a "highly correlative public attribute value".

According to one embodiment, tuples containing public attribute values that are highly correlated with private attribute values are processed in a fashion either to camouflage the public attributes of the tuple or to remove such tuples from identification in the database. Tuples are "camouflaged" by combining the specific public attribute values of the tuples, that are highly correlated with one or more specific private attribute values of the tuples, with other public attribute values of the tuples to reduce the correlation.

A method and system are therefore provided wherein attributes are classified as private or public and wherein the correlation between public and private attributes is reduced by camouflaging highly correlative public attribute values. The invention provides for introduction of an adjustable level of uncertainty in deducing private information from the results of queries executed against the demographics relational database.

DETAILED DESCRIPTION OF THE INVENTION

As mentioned before, the present invention can protect the confidentiality of virtually any kind of information in both relational and non-relational databases and in a variety of environments including communication networks. For purposes of simplicity and clarity, the invention is illustrated below using a communications network environment and a relational database containing demographics information. In the embodiment discussed below, advertisers submit queries for execution against the relational demographics database for purposes of identifying a target audience for advertising. Again, this is illustrative; the invention can also work in other applications wherein queries are submitted to achieve other goals.

Figure 4:
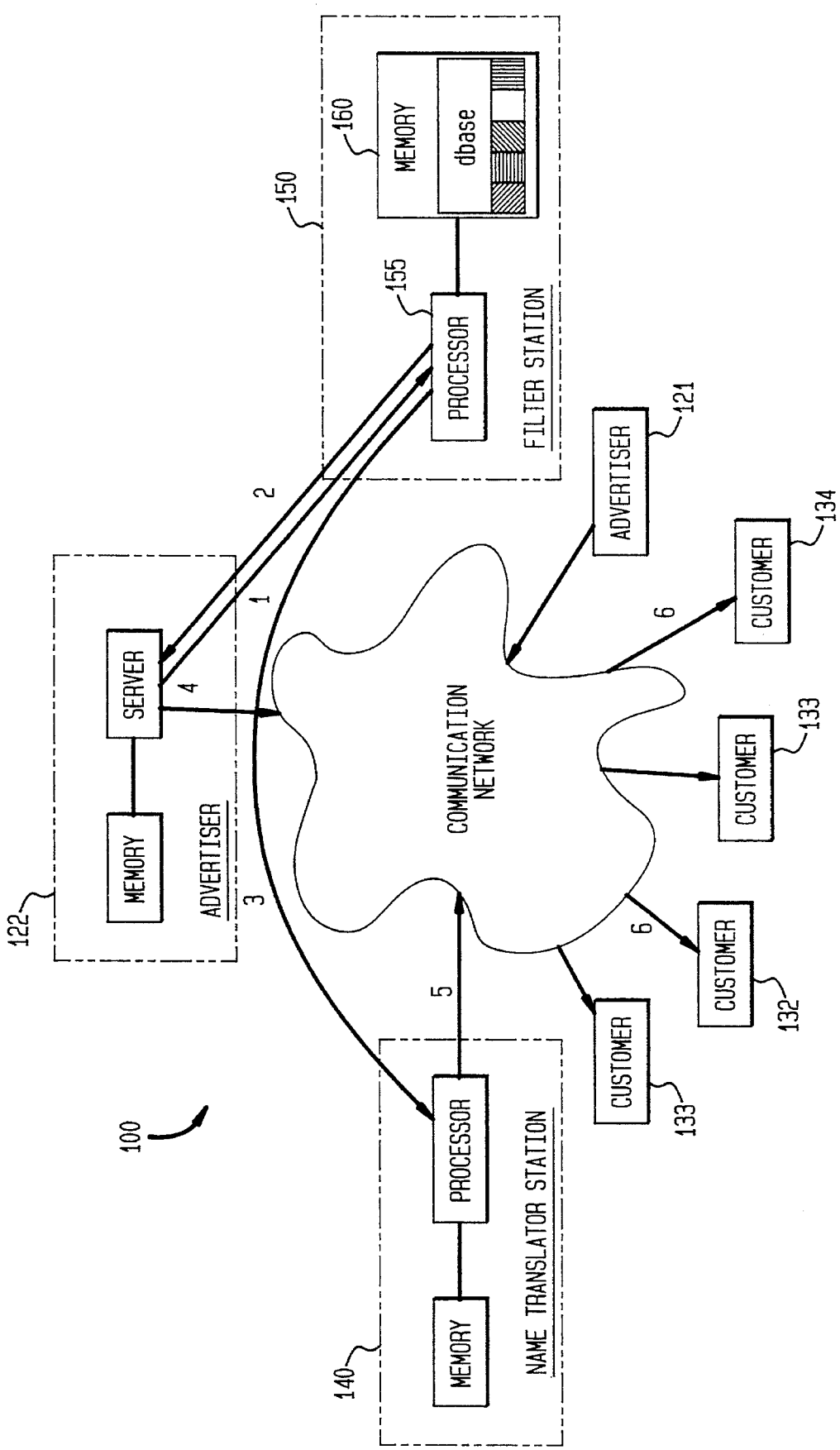
FIG. 4 depicts a communications network according to an embodiment of the present invention with anonymity protection of private customer information.

FIG. 4 shows an illustrative communications network 100 according to the present invention. As shown, advertisers 121 and 122, customers 131, 132, 133 and 134, and a name translation station 140 are provided which are connected to the communications network 100. Furthermore, a filter station 150 is provided which is adapted according to the present invention. The filter station 150 has a processor 155 and a memory 160 connected thereto.

Figures 1, 2:
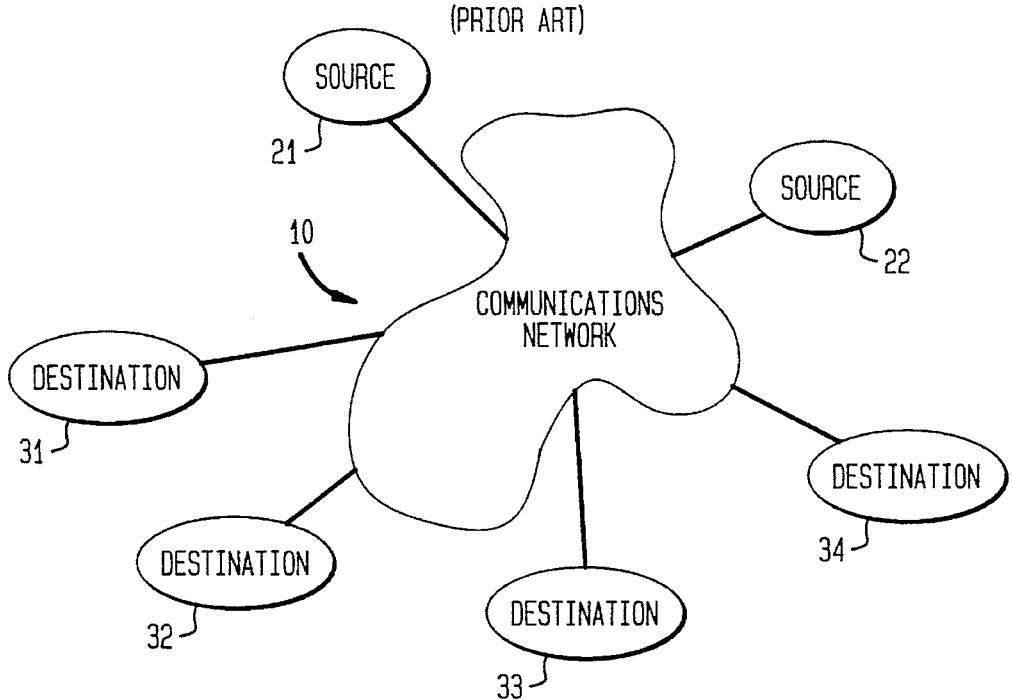
FIG. 1 depicts an ordinary prior art communications network.
FIG. 2 depicts a prior art demographics relational database.
Figure 3:
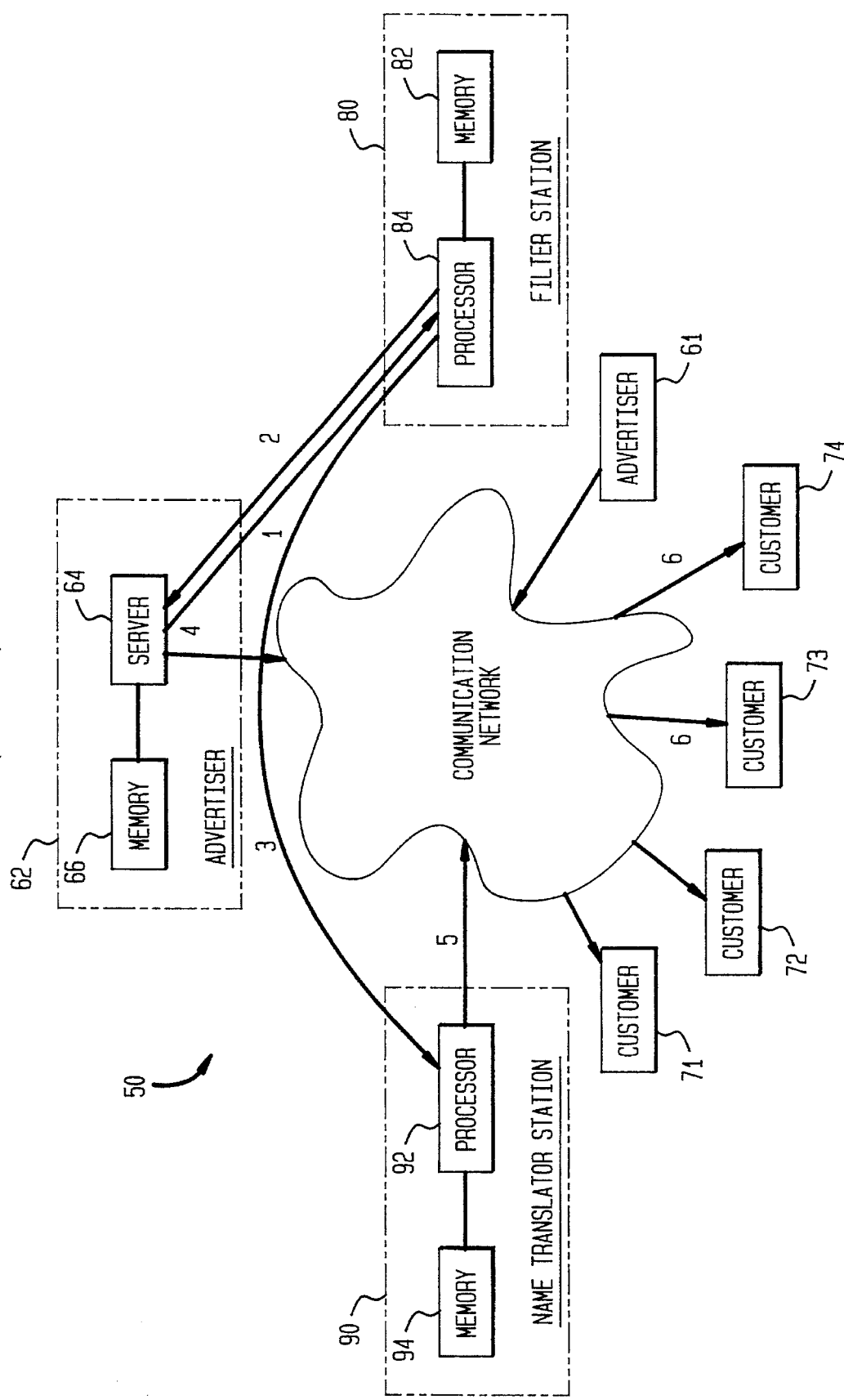
FIG. 3 depicts a prior art communications network with privacy protection of customer network addresses.

Like the processor 84 and memory 82 (FIG. 3) of the filter station 80 (FIG. 3) of the conventional filter station 80 (FIG. 3), the processor 155 and memory 160 can perform various functions for preventing disclosure to the advertisers 121–122 of the raw data. The processor 155 and 160 can also perform functions for preventing deduction by the advertisers 121–122 of private information from the identification of customers (from their network addresses). The processor 155 can receive demographics information from the customers 131–134 and can construct a demographics relational database. The processor 155 can store the demographics relational database in the memory 160. The processor 155 can also receive from the advertisers 121–122, such as the advertiser 122, profiles containing queries for execution against the relational database. In response, the processor 155 identifies the tuples of the relational database which match the profile. The processor 155 then transmits the identifier and the aliases to the advertiser 122.

The processor 155 and memory 160 of the filter station 150 are also capable of processing the demographics relational database to reduce the ability of advertisers to deduce private information from results returned by the filter station 150 in response to profile queries submitted by the advertisers. In the discussions below, it is presumed that the advertisers use the number of returned aliases to deduce private information, although the discussion is general enough to apply to any result returned in response to profile queries.

The processing of the processor 155 and memory 160 can be summarized as partitioning the database into public attributes, for which no confidentiality protection need be provided, and private attributes, for which confidentiality protection is provided. In providing confidentiality protection, it should be noted that some of the information of the demographics relational database is already assumed to be public, or otherwise not worthy of confidentiality protection. For instance, consider a frequent flyer database which contains the following attributes: zip code, telephone number, occupation, dietary restrictions and income level. The telephone number of an individual customer may be widely published in a telephone directory. Furthermore, the occupation of an individual customer, while not widely published, may be considered non-confidential or non-personal. On the other hand, other information such as dietary restrictions and income level may be presumed to be personal and confidential information. After partitioning the database, the correlation between public attributes and private attributes is reduced by camouflaging some highly correlative public attribute values and outright removing some tuples containing highly correlative public attribute values which are difficult to camouflage.

The processor 155 may also partition out an identification attribute from the database which uniquely identifies each tuple. Such an identification could be a network address, social security number, etc. Such information can only be the subject of a profile query if that query does not execute against private attributes or is merely used to update the corresponding tuple of the database.

Illustratively, the public attributes are further divided into important public attributes and non-important public attributes. Advertisers are permitted to specify attribute values of important public attributes with a greater degree of certainty than non-important public attributes. Illustratively, the advertisers may specify which of the attributes are to be treated as important. The invention is illustrated below with important and non-important public attribute partitioning.

In the discussion below, the vector A represents the public attributes of a specified set or group of tuples and each component $<A_1, \ldots, A_n>$, of A represents an individual public attribute vector. The vector A' represents the important public attributes of a specified set or group of tuples and each component $<A'_1, \ldots, A'_m>$ of A', represents an individual important public attribute vector. The vector A" represents the non-important public attributes of a specified set or group of tuples and each component $<A''_1, \ldots, A''_r>$ of A" represents an individual non-important public attribute vector. The vector P represents the private attributes of a specified set or group of tuples and the components $<P_1, \ldots, P_q>$ represents an individual private attribute vector. The vector K represents a vector of uncertainty thresholds for the private attributes P. Illustratively, each scaler component $k_i$ of K is a threshold count of distinctly different private attribute values in $P_i$. Each threshold of uncertainty $k_i$ can be fixed or dynamically adjusted by the processor 155 to adjust the level of confidentiality protection. The vectors V, V', V", V''' and U represent distinct vectors of particular scaler attribute values $<v_1, \ldots, v_n>$, $<v'_1, \ldots, v'_j, \ldots, v'_m>$, etc. for the public attributes A, A', or A" of a single tuple. Herein, the notation $A'_1=v_1, \ldots, A'_n=v_n$, refers to a single tuple (i.e., row of the relational database) for which each designated public attribute vector, e.g., $A'_1$, takes on the corresponding, distinct, scaler attribute value, e.g., $v_1$.

Figure 5:
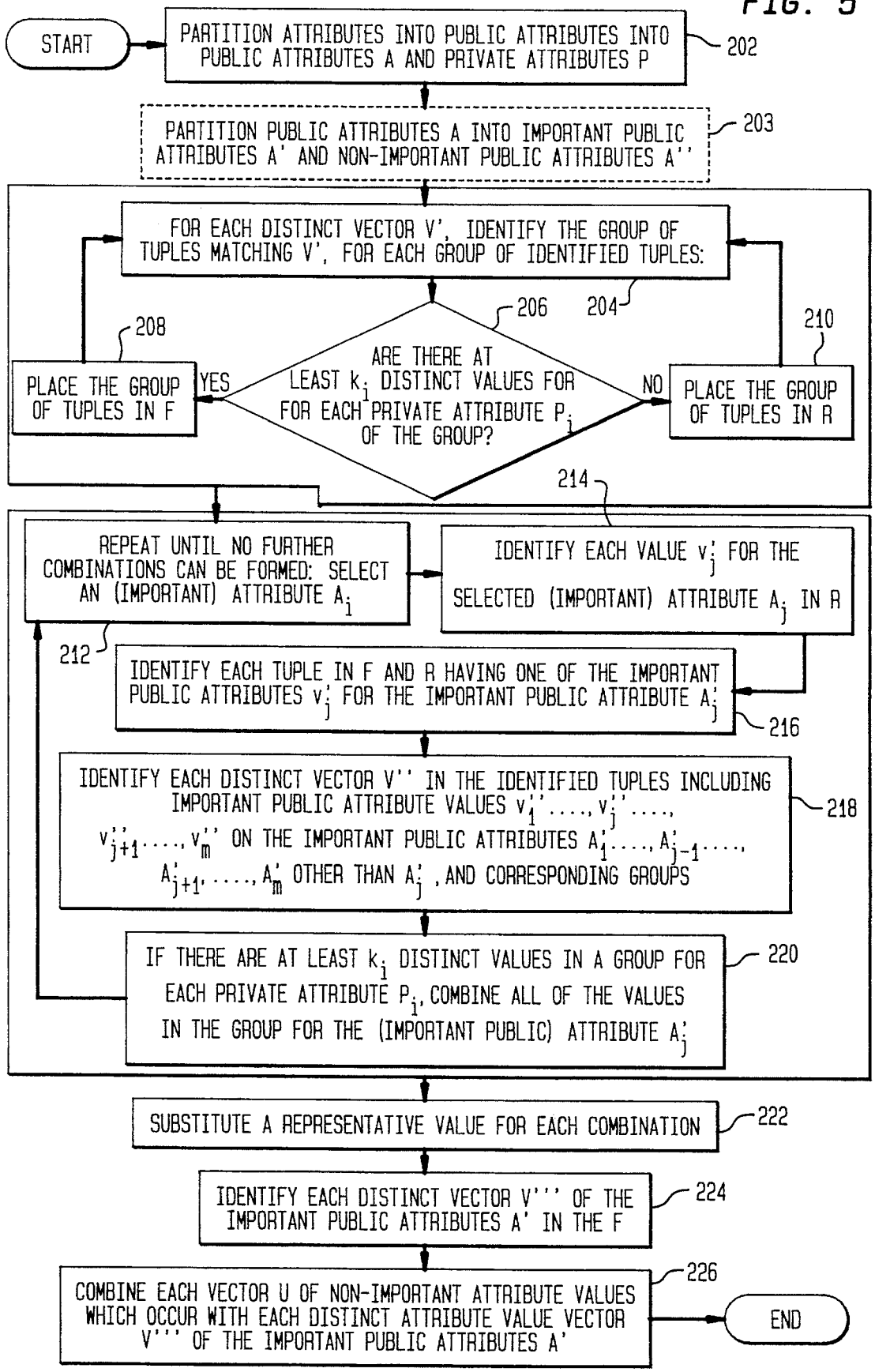
FIG. 5 schematically depicts a flowchart illustrating a method according to one embodiment of the present invention.

FIG. 5 is a flowchart which schematically illustrates a process executed by the processor 155 and memory 160 for ensuring the confidentiality of demographic information from deduction by the advertisers 121–122. In a first step 202, the processor 155 partitions the attributes of the database into public attributes $A_1, \ldots, A_n$, containing non-confidential information and private attributes $P_1, \ldots, P_q$, containing confidential information. For example, suppose the attributes are age, height, religious affiliation and salary. The attributes age and height might be designated as public attributes whereas the attributes religious affiliation and salary might be designated as private attributes.

Next, in steps 204–226, the processor 155 removes high correlations between public and private attributes of tuples in the database. Stated another way, consider a specific vector of particular attribute values V such that $A_1=v_1$, $A_2=v_2, \ldots, A_n=v_n$. This vector V identifies a group of tuples which have values for public attributes $A_1, \ldots, A_n$ that match V. The database is processed to ensure that for any such group of tuples identified by any vector V, there is a threshold level of uncertainty $k_i$ about the values of any $i^{th}$ private attribute $P_i$ in the identified set. For example, consider a database having only public attributes of age and occupation and only private attributes of salary range. The database may have certain vectors of age and occupation (e.g., <age:35, occupation: doctor>) for which there are relatively few different values for salary (e.g., salary: top 5%). In processing the database, certain attribute values are combined in an attempt to "camouflage" tuples which otherwise would have easily deducible private attributes. Other tuples which cannot be camouflaged are removed.

(As discussed in greater detail below, "removed" tuples can be treated in one of a number of ways. For instance, the removed tuples can be excluded from query execution and thus would never receive a targeted advertisement. Alternatively, the "removed" tuples are not excluded from either query execution or targeted advertising. However, the processor 155 must take steps to ensure that the confidentiality of private attribute values of such removed tuples is not compromised by query execution.)

In steps 204–210, the processor 155 partitions the database into a "safe" set F and an "unsafe" set R of tuples. In step 204, the processor forms each possible vector of important public attribute values V' which vector V' includes one attribute value $<v'_1, \ldots, v'_j, \ldots, v'_m>$ for each important public attribute $A'_1, \ldots, A'_j, \ldots, A'_m$. For example, the following are distinct vectors which may be formed on a database with important public attributes age, weight and occupation and private attribute salary: <age=53, occupation=doctor>; <age=35, occupation=doctor>; <age=35, occupation=minister>; etc. A group of tuples corresponds to each of these vectors V'. That is, each tuple in a particular group contains the same important attribute values as the vector V' to which the group corresponds. For example, the vector <age=35, occupation=minister> might identify the tuples:

age=35, occupation=minister, salary=70%
    age=35, occupation=minister, salary=70%
    age=35, occupation=minister, salary=65%
    age=35, occupation=minister, salary=35%
    age=35, occupation=minister, salary=40%
    age=35, occupation=minister, salary=40%
    age=35, occupation=minister, salary=15%

In step 206, for each group thus formed, the processor 155 compares the number of distinct attribute values in each $i^{th}$ private attribute $P_i$ of the group to the corresponding uncertainty threshold $k_i$. If there are at least $k_i$ distinct private attribute values in the group for each $i^{th}$ private attribute $P_i$, the processor 155 adds the group of tuples to the set F in step 208. Otherwise, the processor 155 adds the group of tuples to the set R in step 210. For example, suppose that $k_i$ is set to 4 in the above age, occupation, salary example. In such a case, there are 5 distinct values for the private attribute salary, namely, 70%, 65%, 40%, 35% and 15%. Thus, all of these tuples may be added to the set F. On the other hand, suppose another group of tuples was identified for the vector <age=35 occupation=doctor> as follows:

age=35, occupation=doctor salary=5%
    age=35, occupation=doctor salary=5%
    age=35, occupation=doctor salary=10%
    age=35, occupation=doctor salary=10%
    age=35, occupation=doctor salary=5%
    age=35, occupation=doctor salary=10%
    age=35, occupation=doctor, salary=5%
    age=35, occupation=doctor, salary=15%
    age=35, occupation=doctor, salary=5%
    age=35, occupation=doctor, salary=5%
    age=35, occupation=doctor, salary=15%

This group has only 3 distinct salary attribute values, namely, 5%, 10%, and 15%. Thus, the processor 155 would add these tuples to the set R.

Next in steps 212–222, the processor 155 combines selected important public attribute values. In step 212, the processor 155 selects an important attribute $A'_j$. Illustratively, the processor 155 selects each $j^{th}$ important attribute in decreasing number of distinct attribute values over the entire database. The processor 155 then executes the steps 214–226 with the selected important public attribute $A'_j$. In step 214, the processor 155 identifies each distinct value $v'_j$ of the selected important public attribute $A'_j$ in the set R. In step 216, the processor 155 then identifies each tuple in the both sets F and R having each important public attribute value $v'_j$ (identified in the set R) for the important public attribute $A'_j$. For example, suppose age is selected as the attribute $A'_j$. Then age=35 is a public attribute value that is contained by the tuples with public attribute values <age=35, occupation=doctor> in the set R. Age=35 is also a public attribute value contained by the tuples with public attribute values <age=35, occupation=minister> in the set F. Therefore, the following tuples in sets R and F are identified:

age=35, occupation=minister salary=70%
    age=35, occupation=minister salary=70%
    age=35, occupation=minister salary=65%
    age=35, occupation=minister salary=35%
    age=35, occupation=minister salary=40%
    age=35, occupation=minister salary=40%
    age=35, occupation=minister salary=15%
    age=35, occupation=doctor, salary=5%
    age=35, occupation=doctor, salary=5%
    age=35, occupation=doctor, salary=10%
    age=35, occupation=doctor, salary=10%
    age=35, occupation=doctor, salary=5%
    age=35, occupation=doctor salary=10%
    age=35, occupation=doctor salary=5%
    age=35, occupation=doctor salary=15%
    age=35, occupation=doctor, salary=5%
    age=35, occupation=doctor, salary=5%
    age=35, occupation=doctor, salary=15%

Next in step 218, the processor identifies each distinct vector V" in the identified tuples of sets F and R where the vector V" includes important public attribute values $v''_1, \ldots, v''_{j-1}, v''_{j+1}, \ldots, v''_m$ on the important public attributes $A'_1, \ldots, A'_{j-1}, A'_{j+1}, \ldots, A'_m$ other than $A'_j$. A group of the tuples which were identified in the sets R and F corresponds to each distinct vector V". That is, each tuple in a particular group has the attribute values of the particular attribute value vector V" to which the group corresponds. Such tuples are identified by the processor 155 in step 218.

For example, suppose the public attributes are age, weight and height and the private attribute is salary. Suppose the values $v'_j=35$ and $v'_j=53$ identify the following tuples:

age=35, weight=150, height=6', salary=5%
    age=53, weight=150 height=6', salary=10%
    age=35, weight=160, height=6', salary=10% age=53, weight=160, height=5.5', salary=15%
age=35, weight=150, height=5.5', salary=5%
age=53, weight=150, height=5.5', salary=10%
age=35, weight=150, height=5.5', salary=15%
age=53, weight=160, height=6', salary=20%

The vectors V" are: <weight=150, height=6'>; <weight=160, height=6'>, <weight=150, height=5.5'> and <weight=160, height=5.5'>. The identified groups are as follows:

weight=150, height=6'
age=35, weight=150, height=6', salary=5%
age=53, weight=150, height=6', salary=10%
weight=160, height=6'
age=35, weight=160, height=6', salary=10%
age=53, weight=160, height=6', salary=20%
weight=160, weight=5.5'
age=53, weight=160, height=5.5', salary=15%
weight=150, height=5.5'
age=35, weight=150, height=5.5', salary=5%
age=53, weight=150, height=5.5', salary=10%
age=35, weight=150, height=5.5', salary=15%

Next, in step 220, if there are at least $k_i$ distinct private attributes values in a group for each $i^{th}$ private attribute $P_i$, the processor 155 combines all of the values in the group for the important public attribute $A'_j$. Illustratively, each value $v'_j$ may only be combined once. For example, suppose k=3 for salary. Then the group corresponding to vector V"=<weight=150, height=5.5'> satisfies the threshold of uncertainty. The age attribute values are therefore combined to produce the tuples:

age={35,53}, weight=150, height=5.5', salary=5%
age={35,53}, weight=150, height=5.5', salary=10%
age={35,53}, weight=150, height=5.5', salary=15%

In step 222, the processor 155 substitutes a representative public attribute value for each combination. Continuing with our example, the representative value may be the first public attribute value $v'_j$ selected, i.e., age=35, to produce the tuples:

age=35, weight=150, height=5.5', salary=5%
age=35, weight=150, height=5.5', salary=10%
age=35, weight=150, height=5.5', salary=15%

In step 224, the processor 155 identifies each distinct vector V"' of the important public attributes A' in the set F. In step 226, the processor 155 also identifies each vector U of non-important public attribute values, i.e., the values $u_1$, . . . ,$u_t$ such that $A"_1=u_1$, $A"_2=u_2$, . . . ,$A"_t=u_t$ which occur with each distinct attribute value vector V"' of the important public attributes A'. In step 226, the processor 155 combines each vector U of non-important public attribute values with the distinct attribute value vector V"' of the important public attributes A' with which it occurs.

For example, suppose the set F contained the important attributes sex and age, the non-important attributes height and weight and the private attribute salary. Furthermore, suppose the set F contains the following tuples before this step:

sex=M, age=35, weight=180, height=6', salary=10%
sex=M, age=35, weight=175, height=5', salary=15%
sex=M, age=35, weight=180, height=6', salary=25%
sex=M, age=35, weight=180, height=6', salary=15%
sex=M, age=35, weight=175, height=6', salary=15%
sex=M, age=35, weight=180, height=5', salary=10%
sex=M, age=35, weight=175, height=5', salary=10%
sex=F, age=35, weight=120, height=6', salary=10%
sex=F, age=35, weight=120, height=6', salary=15%
sex=F, age=35, weight=120, height=5', salary=25%
sex=F, age=30, weight=110, height=5', salary=10%
sex=F, age=30, weight=110, height=5', salary=15%
sex=F, age=30, weight=120, height=6', salary=15%
sex=F, age=30, weight=110, height=5', salary=25%

The distinct vectors V"' of important public attribute values A' are <sex=F, age=35>, <sex=F, age=30> and <sex=M, age=35>. The vectors U occurring with V"'=<sex=F, age=35> are <weight=120, height=6'>, <weight=120, height=5'>. The vectors U occurring with V"'=<sex=F, age=30> are <weight=110, height=5'> and <weight=120, height=6'>. The vectors U occurring with V"'=<sex=M, age=35> are <weight=180, height=6'>, <weight=175, height=6'>, <weight=175, height=5'> and <weight=180, height=5'>. The combined tuples are as follows:

sex=M, age=35, <weight=180, 175>, <height=6',5'>, salary=10%
sex=M, age=35, <weight=180,175>, <height=6',5'>, salary=15%
sex=M, age=35, <weight=180,175>, <height=6',5'>, salary=25%
sex=M, age=35, <weight=180,175>, <height=6',5'>, salary=15%
sex=M, age=35, <weight=180,175>, <height=6',5'>, salary=15%
sex=M, age=35, <weight=180,175>, <height=6',5'>, salary=10%
sex=M, age=35, <weight=180,175>, <height=6',5'>, salary=10%
sex=F, age=35, <weight=120,110>, <height=6',5'>, salary=10%
sex=F, age=35, <weight=120,110>, <height=6',5'>, salary=15%
sex=F, age=35, <weight=120,110>, <height=6',5'>, salary=25%
sex=F, age=30, <weight=120,110>, <height=6',5'>, salary=10%
sex=F, age=30, <weight=120,110>, <height=6',5'>, salary=15%
sex=F, age=30, <weight=120,110>, <height=6',5'>, salary=15%
sex=F, age=30, <weight=120,110>, <height=6',5'>, salary=25%

Note, that in the above process, where the public attributes are partitioned into important public attributes and non-important public attributes, only the important public attributes are checked to determine if they might require camouflaging. The non-important public attributes are simply combined as set out in step 224. As mentioned above, the advertisers illustratively specify which of the public attributes A are important public attributes A' and which are non-important public attributes A". This is significant because the partitioning of the public attributes into important and non-important governs which public attributes are checked to determine if they require camouflaging and which public attributes are simply combined in step 224.

After executing steps 202-224, the processor 155 can store the tuples of the set F as the new demographics relational database. Illustratively, the processor 155 discards, i.e., does not execute queries against, the tuples of the set R. Queries may then be executed against the new demographics relational database. However, the advertisers must be cognizant of the existence of combined values and should refer to the combined public attribute values in formulating the profile queries.

Alternatively, instead of constructing a new demographics relational database, the processor 155 maintains a record in the memory 160 indicating the partitioning of the attribute values. Consider the above database discussed in connection with step 224. The following are examples of partitions resulting from steps 202–224:

(1) for sex=F, age=35, the tuples:

sex=F, age=35, <weight=120,110>, <height=6',5'>, salary=10% sex=F, age=35, <weight=120,110>, <height=6',5'>, salary=15% sex=F, age=35, <weight=120,110>, <height=6',5'>, salary=25%

(2) for sex=F, age=30, the tuples:

sex=F, age=30, <weight=120,110>, <height=6',5'>, salary=10% sex=F, age=30, <weight=120,110>, <height=6',5'>, salary=15% sex=F, age=30, <weight=120,110>, <height=6',5'>, salary=15% sex=F, age=30, <weight=120,110>, <height=6',5'>, salary=25%

The processor 155 maintains a record containing indications of the partitions.

However, if this is done, the processor 155 must perform some post processing to ensure that no profile queries violate the partition. That is, queries which identify all tuples within a partition do not violate the partition. However, queries which attempt to identify only some of the tuples within a partition violate the partition. More formally stated, a query is said to violate a partition if the following occurs. Suppose there are two tuples, represented as database row vectors $T_1 = <A_1=v_1, \ldots, A_k=v_k, \ldots, A_m=v_m>$ and $T_2 = <A_1=u_1, \ldots, A_k=u_k, \ldots, A_m=u_m>$, wherein both tuples $T_1$ and $T_2$ are in the same partition. That is, for each important attribute $A_1, \ldots, A_k$, $v_1=u_1, v_2=u_2, \ldots$, and $v_k=u_k$. A query violates the partition if it has criteria directed to both public and private attributes and if the query is satisfied by the tuple $T_1$ but not by the tuple $T_2$. To determine if a profile query violates the partition, the processor 155 can execute the profile query against the demographics relational database. The processor 155 can then compare the tuples identified by the profile query to the non-identified tuples of the demographics relational database to determine if a non-identified tuple $T_2$ and an identified tuple $T_1$ exists for which the corresponding attribute values are in the same partitions as described above.

If a profile query violates the partition, the processor 155 can outright reject the profile query. Alternatively, the processor 155 modifies the set of identified tuples by also identifying, i.e., including the tuples $T_2$ which were not initially identified by the query, to remove the partition violation. However, if such modifications are performed, the processor 155 should notify the advertiser of the modification and its nature. Illustratively, the processor 155 achieves this by describing the contents of the partitions of the attributes specified in the advediser's query. For example, the processor 155 can transmit a message regarding the modifications to the advertiser.

In short, a system and method are disclosed for protecting a database against deduction of confidential attribute values therein. A memory is provided for storing the database and a processor is provided for processing the database. Using the processor, the database is electronically partitioned into public attributes, containing non-confidential attribute values, and private attributes, containing private attribute values. The processor is then used to electronically process the private attribute values to reduce any high correlation between public attribute values and private attribute values. Specifically, the processor can partition the database into safe tuples and unsafe tuples, such that each unsafe tuple is a member of a group:

(1) identified by a vector of attribute values (i.e., each tuple of the group has public attribute values matching the vector), and (2) which group has a level of uncertainty as to at least one value of a private attribute that is less than a threshold level of uncertainty.

The processor can then selectively combine the public attribute values of the tuples to camouflage such tuples from deduction of their private attribute values beyond a threshold level of uncertainty or remove such tuples from the database. This is achieved by:

(1) identifying all tuples containing particular attribute values for a selected public attribute, which particular values are contained by at least one tuple with a highly correlative public attribute value, (2) identifying groups of tuples corresponding to, i.e., containing public attribute values that match, distinct vectors of values for the public attributes other than the selected public attribute, (3) combining values of the selected public attribute of each group if there is at least a threshold level of uncertainty for each private attribute value in the group, and (4) removing unsafe tuples for which no combination can be performed to camouflage the unsafe tuples.

Finally, the above discussion is intended to be merely illustrative of the invention. Numerous alternative embodiments may be devised by those having ordinary skill in the art without departing from the spirit and scope of the following claims.

The claimed invention is:

1. A method for protecting a database against deduction of confidential attribute values therein comprising the steps of:

using a processor, electronically partitioning said database into public attributes, containing public attribute values, and private attributes containing private attribute values, and using a processor, electronically processing said values to reduce any high correlation between public attribute values and private attribute values.

2. The method of claim 1 wherein said step of processing further comprises the step of:

using said processor, electronically partitioning tuples of said database into a safe set and an unsafe set.

3. The method of claim 2 wherein said step of processing further comprises the step of:

using said processor, electronically combining a plurality of public attribute values of tuples in said safe and unsafe sets.

4. The method of claim 2 wherein tuples are partitioned into said unsafe set if:

a vector of attribute values exists which identifies a group of tuples having said vector of attribute values for corresponding public attributes thereof wherein a level of uncertainty as to a value of at least one of said private attributes of said group is less than a threshold level of uncertainty.

5. The method of claim 4 wherein said level of uncertainty as to a value of a private attribute of said group is less than said threshold level of uncertainty if said group contains fewer distinct ones of said values of said one private attribute than a threshold number.

6. The method of claim 2 wherein said public attribute values are further partitioned into important public attribute values and non-important public attribute values and wherein said tuples are partitioned into said unsafe set if:

a vector of attribute values exists which identifies a group of tuples having said vector of attribute values for corresponding important public attributes thereof wherein a level of uncertainty as to a value of at least one of said private attributes of said group is less than a threshold level of uncertainty.

7. The method of claim 2 wherein said step of partitioning said tuples into safe and unsafe sets further comprises the steps of:

using said processor, electronically forming different possible vectors of public attribute values for said public attributes, and using said processor, for each group of tuples identified by said vectors of public attribute values, electronically partitioning said tuples of said group into said safe set if there is at least a threshold level of uncertainty for private attribute values in said group and partitioning said tuples of said group into said unsafe set otherwise.

8. The method of claim 7 wherein each possible vector is formed in said step of forming.

9. The method of claim 7 wherein said vectors contain only important public attribute values.

10. The method of claim 1 wherein said step of processing further comprises the step of:

using said processor, electronically combining a plurality of public attribute values of tuples so as to prevent deduction, beyond a threshold level of uncertainty, of private attribute values of said tuples.

11. The method of claim 10 wherein only important public attribute values are combined in said step of combining.

12. The method of claim 10 further comprising the steps of:

using said processor, electronically identifying all tuples containing particular values for a selected public attribute, which particular values are contained by at least one tuple with a highly correlative public attribute value, using said processor, electronically identifying distinct vectors having a particular value for each public attribute other than said selected public attribute, and electronically identifying a group of tuples for each one of said distinct vectors, wherein each tuple of said identified group has said distinct vector of values for public attributes thereof, other than said particular public attribute, using said processor, electronically combining values of said selected public attribute of one of said groups corresponding to one of said distinct vectors if there is at least a threshold level of uncertainty for each private attribute value in said group corresponding to said distinct vector.

13. The method of claim 12 wherein each possible distinct vector is identified in said step of identifying.

14. The method of claim 12 wherein each at least one tuple with a highly correlative attribute value is a member of a group of tuples which satisfies:

a vector of attribute values exists which identifies said group of tuples having said vector of attribute values for corresponding public attributes thereof wherein a level of uncertainty as to a value of a private attribute of said group is less than a threshold level of uncertainty.

15. The method of claim 10 further comprising the step of:

using said processor, electronically substituting a representative value for said combined public attribute values.

16. The method of claim 10 wherein said public attributes are divided into important public attributes and non-important public attributes, wherein said step of combining is performed only on said important public attribute values and wherein said method further comprises the step of:

using said processor, electronically identifying each distinct vector of important public attribute values, and using said processor, electronically combining each distinct vector of non-important public attribute values which occur with each of said distinct vectors of important public attribute values.

17. The method of claim 1 further comprising the steps of:

using said processor, electronically storing in a memory a database resulting from said steps of partitioning and processing, using said processor, electronically receiving a profile query from an advertiser, and using said processor, electronically executing said profile query against said database stored in said memory.

18. The method of claim 1 further comprising the steps of:

prior to said steps of partitioning and processing, using said processor, electronically storing a database in said memory, and after said steps of partitioning and processing, using said processor, electronically storing indications of modifications to said database stored in said memory which modifications result from said steps of partitioning and processing, using said processor, electronically receiving a profile query from an advertiser, using said processor, electronically executing said profile query against said database stored in said memory, and using said processor, electronically rejecting said query if said query violates a partition of said database, which partition is indicated by said indications stored in said memory.

19. The method of claim 18 wherein said query violates said partition if:

said indications indicate that said database includes first and second tuples in the same partition, said profile query specifies criteria directed to both public and private attributes and said query is satisfied by said first tuple but not said second tuple.

20. The method of claim 1 further comprising the steps of:

prior to said steps of partitioning and processing, using said processor, electronically storing a database in said memory, and after said steps of partitioning and processing, using said processor, electronically storing indications of modifications to said database stored in said memory which modifications result from said steps of partitioning and processing, using said processor, electronically receiving a profile query from an advertiser, using said processor, electronically executing said profile query against said database stored in said memory, and using said processor, if said profile query violates a partition of said database, which partition is indicated by said indications stored in said memory, then identifying tuples of said database including those tuples which said query failed to identify and which violate said partition of said database.

21. The method of claim 1 further comprising the steps of:
after said steps of partitioning and processing,
using said processor, electronically receiving a profile query from advertisers,
using said processor, electronically executing said profile query against said database, and
using said processor, electronically transmitting an identifier corresponding to said profile query and aliases of tuples identified by said profile query to said advertiser.

22. The method of claim 21 further comprising the steps of:
using said processor, electronically constructing a table for translating said tuple aliases to network addresses of said tuples, and
using said processor, electronically transmitting said identifier for said profile query and said table to a name translator station.

23. The method of claim 22 further comprising the steps of:
transmitting an advertisement, said tuple aliases and said profile query identifier from said advertiser to a communications network,
receiving said advertisement, said tuple aliases and said profile query identifier from said communications network at said name translator station,
at said name translator station, translating said tuple aliases into network addresses of said tuples using said table, and
transmitting said advertisement to customers via said communications network using said network addresses of said tuples.

24. A system for protecting a database against deduction of confidential attribute values therein comprising:
a memory for storing said database, and
a processor, for electronically partitioning said database into public attributes, containing public attribute values, and private attributes containing private attribute values, and for electronically processing said values to reduce any high correlation between public attribute values and private attribute values.

25. The system of claim 24 wherein said processor electronically partitions tuples of said database into a safe set and an unsafe set.

26. The system of claim 25 wherein said processor electronically combines a plurality of public attribute values of tuples in said safe and unsafe sets.

27. The system of claim 25 wherein said processor partitions said tuples into said unsafe set if:
a vector of attribute values exists which identifies a group of tuples having said vector of attribute values for corresponding public attributes thereof wherein a level of uncertainty as to a value of at least one of said private attributes of said group is less than a threshold level of uncertainty.

28. The system of claim 27 wherein said level of uncertainty as to a value of a private attribute of said group is less than said threshold level of uncertainty if said group contains fewer distinct ones of said values of said one private attribute than a threshold number.

29. The system of claim 25 wherein said processor further partitions said public attribute values into important public attribute values and non-important public attribute values and wherein said processor partitions said tuples into said unsafe set if:
a vector of attribute values exists which identifies a group of tuples having said vector of attribute values for corresponding important public attributes thereof wherein a level of uncertainty as to a value of at least one of said public attributes of said group is less than a threshold level of uncertainty.

30. The system of claim 25 wherein said processor electronically forms different possible vectors of public attribute values for said public attributes, and for each group of tuples identified by said vectors of public attribute values, electronically partitions said tuples of said group into said safe set if there is at least a threshold level of uncertainty for private attribute values in said group and partitioning said tuples of said group into said unsafe set otherwise.

31. The system of claim 30 wherein said processor electronically forms each possible vector of public attribute values.

32. The system of claim 30 wherein said vectors contain only important public attribute values.

33. The system of claim 24 wherein said processor electronically combines a plurality of public attribute values of tuples so as to prevent deduction, beyond a threshold level of uncertainty, of private attribute values of said tuples.

34. The system of claim 33 wherein only important public attribute values are combined by said processor.

35. The system of claim 33 wherein said processor electronically identifies all tuples containing particular values for a selected public attribute, which particular values are contained by at least one tuple with a highly correlative public attribute value,
wherein said processor electronically identifies distinct vectors having a particular value for each public attribute other than said selected public attribute,
wherein said processor electronically identifies a group of tuples for each one of said distinct vectors, wherein each tuple of said identified group has said distinct vector of values for public attributes thereof, other than said particular public attribute, and
wherein said processor electronically combines values of said selected public attribute of one of said groups corresponding to one of said distinct vectors if there is at least a threshold level of uncertainty for each private attribute value in said group corresponding to said distinct vector.

36. The system of claim 35 wherein said processor electronically identifies each distinct vector having a particular value for each public attribute other than said selected public attribute.

37. The system of claim 35 wherein each at least one tuple with a highly correlative attribute value is a member of a group of tuples which satisfies:
a vector of attribute values exists which identifies said group of tuples having said vector of attribute values for corresponding public attributes thereof wherein a level of uncertainty as to a value of a private attribute of said group is less than a threshold level of uncertainty.

38. The system of claim 33 wherein said processor electronically substitutes a representative value for said combined public attribute values.

39. The system of claim 33 wherein said processor partitions said public attributes into important public attributes and non-important public attributes, wherein said processor combines only said important public attribute values, wherein said processor electronically identifies each distinct vector of important public attribute values, and wherein said processor electronically combines each distinct vector of non-important public attribute values which occur with each of said distinct vectors of important public attribute values.

40. A communications system comprising:

a filter station comprising:
   a memory for storing a database, and
   a processor for electronically partitioning said database into public attributes, containing public attribute values, and private attribute containing private attribute values, and for electronically
   processing said values to reduce any high correlation between public attribute values and private attribute values, and
an advertiser, for transmitting a profile query to said processor of said filter station.

41. The communications system of claim 40 wherein said processor electronically stores in a memory a database resulting from said partitioning and processing of said database, and wherein said processor electronically executes said profile query against said database stored in said memory.

42. The communications system of claim 40 wherein prior to said partitioning and processing of said database, said processor, electronically stores a database in said memory, and after said steps of partitioning and processing, said processor electronically stores indications of modifications to said database stored in said memory which modifications result from said steps of partitioning and processing, said processor electronically executes said profile query against said database stored in said memory, and said processor electronically rejects said query if said query violates a partition of said database, which partition is indicated by said indications stored in said memory.

43. The communications system of claim 42 wherein said profile query violates said partition if:
   said indications indicate that said database includes first and second tuples in the same partition,
   said profile query specifies criteria directed to both public and private attributes and said query is satisfied by said first tuple but not said second tuple.

44. The communications system of claim 40 wherein prior to said partitioning and processing of said database, said processor, electronically stores a database in said memory, and after said steps of partitioning and processing, said processor electronically stores indications of modifications to said database stored in said memory which modifications result from said steps of partitioning and processing, said processor electronically executes said profile query against said database stored in said memory, and, if said profile query violates a partition of said database, which partition is indicated by said indications stored in said memory, then said processor electronically identifies tuples of said database including those tuples which said query failed to identify and which violate said partition of said database.

45. The communications system of claim 40 wherein after said processor electronically partitions and processes said database, said processor electronically executes said profile query against said database, and wherein said processor electronically transmits an identifier from said profile query and aliases of tuples identified by said profile query to said advertiser.

46. The communications system of claim 45 further comprising:

a name translator station, and wherein said processor electronically constructs a table for translating said tuple aliases to network addresses of said tuples, and electronically transmits said identifier for said profile query and said table to said name translator station.

47. The communications system of claim 46 further comprising:

a plurality of customers, each of said customers having a network address for delivery of advertisements, and a communications network interconnecting said advertiser, said processor of said filter station, said name translator station and said plurality of customers, wherein said advertiser transmits an advertisement, said tuple aliases and said profile query identifier to said communications network, and wherein said name translator station receives said advertisement, said tuple aliases and said profile query identifier from said communications network, translates said tuple aliases into network addresses of said tuples using said table, and transmits said advertisement to said particular ones of said plurality of customers via said communications network using said network addresses of said tuples.

* * * * *